(12) United States Patent
Takahashi et al.

(10) Patent No.: US 11,310,873 B2
(45) Date of Patent: Apr. 19, 2022

(54) FLUID HEATING COMPONENT, AND FLUID HEATING COMPONENT COMPLEX

(71) Applicant: NGK Insulators, Ltd., Nagoya (JP)

(72) Inventors: Hironori Takahashi, Nagoya (JP); Hiroki Ishida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 358 days.

(21) Appl. No.: 16/296,734

(22) Filed: Mar. 8, 2019

(65) Prior Publication Data

US 2019/0297683 A1 Sep. 26, 2019

(30) Foreign Application Priority Data

Mar. 20, 2018 (JP) .............................. JP2018-053318
Jan. 16, 2019 (JP) .............................. JP2019-005518

(51) Int. Cl.
*H05B 6/10* (2006.01)
*B28B 3/20* (2006.01)

(52) U.S. Cl.
CPC ............. *H05B 6/108* (2013.01); *H05B 6/107* (2013.01); *B28B 3/20* (2013.01); *B28B 2003/203* (2013.01)

(58) Field of Classification Search
CPC .......... H05B 6/10; H05B 6/105; H05B 6/106; H05B 6/107; H05B 6/108; C04B 38/0006; C04B 38/0007; C04B 38/0009; C04B 2111/00793; C04B 2111/0081; C04B 41/009; C04B 41/4527; C04B 41/4539; C04B 41/4541; C04B 41/4572; C04B 41/5096; C04B 41/51; C04B 41/5114; C04B 41/5127; C04B 41/5133; C04B 41/5144; C04B 41/5155; C04B 41/5427; C04B 41/85; C04B 41/88; C04B 35/04; C04B 35/195; C04B 35/515; C04B 35/56;

(Continued)

(56) References Cited

U.S. PATENT DOCUMENTS 3,163,841 A 12/1964 Willet
2003/0181310 A1* 9/2003 Yamamoto .......... H01L 21/6831
501/119

(Continued)

FOREIGN PATENT DOCUMENTS

CN 1034462 A 8/1989
CN 1732329 A 2/2006

(Continued)

OTHER PUBLICATIONS

U.S. Appl. No. 16/296,765, filed Mar. 8, 2019, Hironori Takahashi.

(Continued)

*Primary Examiner* — Hung D Nguyen
(74) *Attorney, Agent, or Firm* — Burr & Brown, PLLC

(57) ABSTRACT

A fluid heating component including: a pillar-shaped member made of ceramics and formed with through channels through which a fluid passes, and a conductive coating layer disposed on at least a part of a circumferential surface of the pillar-shaped member, wherein the conductive coating layer is disposed on coats the whole circumference of a cut surface of the pillar-shaped member in a state where the conducive coating layer is electrically connected, in the cut surface of the pillar-shaped member which is perpendicular to a passing direction of the fluid.

10 Claims, 6 Drawing Sheets

(58) Field of Classification Search
CPC ............ C04B 35/5607; C04B 35/5626; C04B 35/565; C04B 35/573; C04B 35/58; C04B 35/581; C04B 35/583; C04B 35/584; B28B 3/20; B28B 2003/203; B28B 11/14; B28B 11/006
USPC ........ 219/600, 628, 629, 634, 635, 642, 643
See application file for complete search history.

(56) References Cited

U.S. PATENT DOCUMENTS

| | | | |
|---|---|---|---|
| 2005/0178761 A1* | 8/2005 | Wakamatsu | F22B 1/281 219/629 |
| 2005/0262817 A1* | 12/2005 | Hatanaka | F01N 3/0217 55/282.3 |
| 2012/0241439 A1 | 9/2012 | Hashimoto et al. | |
| 2016/0017777 A1 | 1/2016 | Kasai et al. | |
| 2017/0260887 A1 | 9/2017 | Takase et al. | |

FOREIGN PATENT DOCUMENTS

| | | |
|---|---|---|
| CN | 101042950 A | 9/2007 |
| CN | 102691876 A | 9/2012 |
| JP | 2001-054723 A | 2/2001 |
| JP | 2010-013945 A | 1/2010 |
| JP | 2013-238116 A | 11/2013 |
| JP | 2017-166327 A | 9/2017 |
| WO | 2014/148506 A1 | 9/2014 |

OTHER PUBLICATIONS

Chinese Office Action, Chinese Application No. 201910187017.5, dated Oct. 18, 2021 (9 pages).
Chinese Office Action (with English translation), Chinese Application No. 201910187017.5, dated Jun. 17, 2021 (15 pages).
Chinese Office Action, Chinese Application No. 201910187017.5, dated Jan. 20, 2022 (9 pages).
Japanese Office Action, Japanese Application No. 2019-005518, dated Mar. 1, 2022 (3 pages).

* cited by examiner

FLUID HEATING COMPONENT, AND FLUID HEATING COMPONENT COMPLEX

The present application is an application based on JP 2018-053318 filed on Mar. 20, 2018 and JP2019-005518 filed on Jan. 16, 2019 with Japan Patent Office, the entire contents of which are incorporated herein by reference.

BACKGROUND OF THE INVENTION

Field of the Invention

The present invention relates to a fluid heating component, and a fluid heating component complex, and more particularly, it relates to a fluid heating component using a ceramic member, for example, a honeycomb structure to heat fluids such as a gas and a liquid by an electromagnetic induction heating system, and a fluid heating component complex formed of combined fluid heating components.

Description of the Related Art

Heretofore, for the purposes of, for example, improvement of a fuel efficiency of a car, friction loss at the start of an engine has been decreased and a purification performance of an exhaust gas purifying catalyst has been enhanced. In particular, immediately after the start of the engine, liquids such as cooling water, engine oil and an automatic transmission fluid (ATF) and the exhaust gas purifying catalyst are in a cooled state, and hence an engine performance cannot sufficiently be exerted sometimes. To eliminate such problems, a heating system is employed to rapidly heat the liquid, for example, the cooling water up to a suitable temperature or to activate the exhaust gas purifying catalyst in early stages.

In the heating system, to heat a fluid (a liquid such as the cooling oil or the engine oil or a gas such as an exhaust gas), for example, there is used a fluid heating component including a honeycomb structure made of ceramics and having a high thermal conductivity, and a heating body such as a resistance heating type heater, a high-frequency heating type heater or a combustion heating type heater (see Patent Document 1). The honeycomb structure made of ceramics includes a plurality of cells defined by partition walls, and the cells form through channels for the above fluid. Thus, the honeycomb structure includes the plurality of cells, thereby increasing a contact area with the fluid, and heat generated by the heating body can efficiently propagate to the fluid.

On the other hand, a decomposition method is known in which a fluid containing a halogenated hydrocarbon gas and others are passed through a carrier, while heating the carrier having the conductivity by an electromagnetic induction heating system, to perform a thermal decomposition treatment of halogenated hydrocarbon at a high temperature (see Patent Document 2). According to this method, carbon ceramic such as silicon carbide (SiC), a stainless steel or the like is used as a base of the above carrier, and furthermore, there is used the carrier onto which at least one metal element (group I element) selected from the group consisting of platinum (Pt), palladium (Pd), gold (Au), rhodium (Rh) and nickel (Ni) and having a corrosion resistance to the halogenated hydrocarbon gas and at least one metal element (group II element) selected from the group consisting of tungsten (W), chromium (Cr), iron (Fe), molybdenum (Mo) and vanadium (V) are loaded as catalysts. The conductive carrier onto which these catalysts are loaded is heated by Joule heat of an eddy current generated by an electromagnetic induction coil disposed outside, and hence the fluid passing through the carrier can be heated.

[Patent Document 1] JP-A-2013-238116
[Patent Document 2] JP-A-2001-54723

SUMMARY OF THE INVENTION

However, such a fluid heating component as described above and such a method of decomposing a fluid (a halogenated hydrocarbon gas) by heating as described above have a possibility of causing defects which will be described below. Specifically, the fluid heating component described in Patent Document 1 is constituted of two members made of different materials, i.e., a honeycomb structure made of ceramic and a heating body made mainly of a metal or the like. Consequently, a heat resistance in the vicinity of a boundary between the honeycomb structure and the heating body increases, and heat generated by the heating body might not efficiently propagate through the honeycomb structure. As a result, there is the fear that a heating efficiency decreases.

Furthermore, the honeycomb structure and the heating body are made of the different materials, respectively, and hence a difference in thermal expansion coefficient between the honeycomb structure and the heating body during heating might raise a problem. That is, there is a possibility that gaps, voids and the like are generated in the vicinity of the boundary between the honeycomb structure and the heating body due to the difference in thermal expansion coefficient, and there is a possibility that the heating efficiency further decreases. In particular, when a comparatively large fluid heating component is formed, the above defects caused by the difference in thermal expansion coefficient might become remarkably apparent.

On the other hand, when such a conductive carrier as described in Patent Document 2 is used, SiC itself for use as the carrier has a high electric resistance. Therefore, a heat generation efficiency by an electromagnetic induction heating system decreases, and a temperature of the carrier cannot rapidly rise up to a predetermined temperature sometimes. As a result, there are, for example, demerits that much time is required until the catalyst is activated and that much electric energy is required to raise the temperature up to the predetermined temperature.

To eliminate such problems, the present invention has been developed in view of the above actual circumstances, an object thereof is to provide a fluid heating component which is made of ceramics and which enables efficient heating by an electromagnetic induction heating system and enables quick heating without being influenced by a difference in thermal expansion coefficient, and another object thereof is to provide a fluid heating component complex.

According to the present invention, there are provided a fluid heating component and a fluid heating component complex which will be described below.

According to a first aspect of the present invention, a fluid heating component is provided including a pillar-shaped member made of ceramics and formed with through channels through which a fluid passes, and a conductive coating layer disposed on at least a part of a circumferential surface of the pillar-shaped member, wherein the conductive coating layer is disposed on the whole circumference of a cut surface of the pillar-shaped member in a state where the conducive coating layer is electrically connected, in the cut surface of the pillar-shaped member which is perpendicular to a passing direction of the fluid.

According to a second aspect of the present invention, the fluid heating component according to the above first aspect is provided, wherein the pillar-shaped member is a honeycomb structure including partition walls which define a plurality of cells extending from one end face to the other end face and formed as the through channels.

According to a third aspect of the present invention, the fluid heating component according to the above first or second aspects is provided, wherein the pillar-shaped member is made of dense ceramics, and a porosity of the pillar-shaped member is in a range of 0.1% to 10%.

According to a fourth aspect of the present invention, the fluid heating component according to any one of the above first to third aspects is provided, wherein the pillar-shaped member is made of ceramics having a thermal conductivity of from 50 W/m·K to 300 W/m·K.

According to a fifth aspect of the present invention, the fluid heating component according to any one of the above first to fourth aspects is provided, wherein the pillar-shaped member is made of ceramics containing, as a main component, at least one selected from the group consisting of silicon carbide, silicon nitride, aluminum nitride and magnesium oxide.

According to a sixth aspect of the present invention, the fluid heating component according to any one of the above first to fourth aspects is provided, wherein the pillar-shaped member is made of ceramic containing silicon carbide as a main component, and an electric resistivity of the pillar-shaped member is from 0.01 Ωcm to 10 Ωcm.

According to a seventh aspect of the present invention, the fluid heating component according to any one of the above first to third aspects is provided, wherein the pillar-shaped member is made of ceramic containing, as a main component, cordierite having a thermal expansion coefficient from 0.1 ppm/K to 2 ppm/K.

According to an eighth aspect of the present invention, the fluid heating component according to any one of the above first to seventh aspects is provided, wherein the conductive coating layer possesses a layer structure, and includes an electroless plating layer which is in contact with the surface of the pillar-shaped member, and at least one induction heating layer laminated on the electroless plating layer.

According to a ninth aspect of the present invention, the fluid heating component according to any one of the above first to eighth aspects is provided, wherein the conductive coating layer has a thickness of from 0.1 μm to 500 μm.

According to a tenth aspect of the present invention, a fluid heating component complex which is formed by using heating component according to any one of the above first to ninth aspects is provided, and which is monolithically constructed by using a plurality of prismatic columnar fluid heating components, or which is monolithically constructed by using at least one of the prismatic columnar fluid heating components, and one or a plurality of prismatic columnar pillar-shaped members made of ceramics and formed with through channels through which a fluid passes.

According to a fluid heating component and a fluid heating component complex of the present invention, it is possible to rapidly and efficiently heat the fluid heating component by an electromagnetic induction heating system. As a result, it is possible to employ the fluid heating component in a heating system which is capable of rapidly heating up to a temperature to activate an exhaust gas purifying catalyst even immediately after a car engine is started.

Moreover, when the fluid heating component and the fluid heating component complex according to the present invention are employed in a filter for exhaust gas purification of an automobile engine, it is possible to help to burn off carbon particulates accumulated in the filter by using an electromagnetic induction heating system.

In particular, a conductive coating layer is disposed on at least a circumferential surface of a pillar-shaped member (a honeycomb structure or the like) made of ceramics, and the conductive coating layer is electrically connected in the whole circumference of a cut surface of the member, thereby enabling efficient heating by electromagnetic induction. Furthermore, a local temperature rise does not occur, and it is possible to decrease the fear of occurrence of a defect that a heating efficiency decreases or cracks and the like are generated due to a difference in thermal expansion coefficient between the pillar-shaped member and, for example, the conductive coating layer.

DESCRIPTION OF THE PREFERRED EMBODIMENTS

Hereinafter, description will be made as to embodiments of a fluid heating component of the present invention and a fluid heating component complex with reference to the drawings. It is to be noted that the fluid heating component of the present invention and the fluid heating component complex are not limited to the following embodiments, and changes, modifications, improvements and the like are addable without departing from the gist of the present invention.

1. Fluid Heating Component

Figure 1:
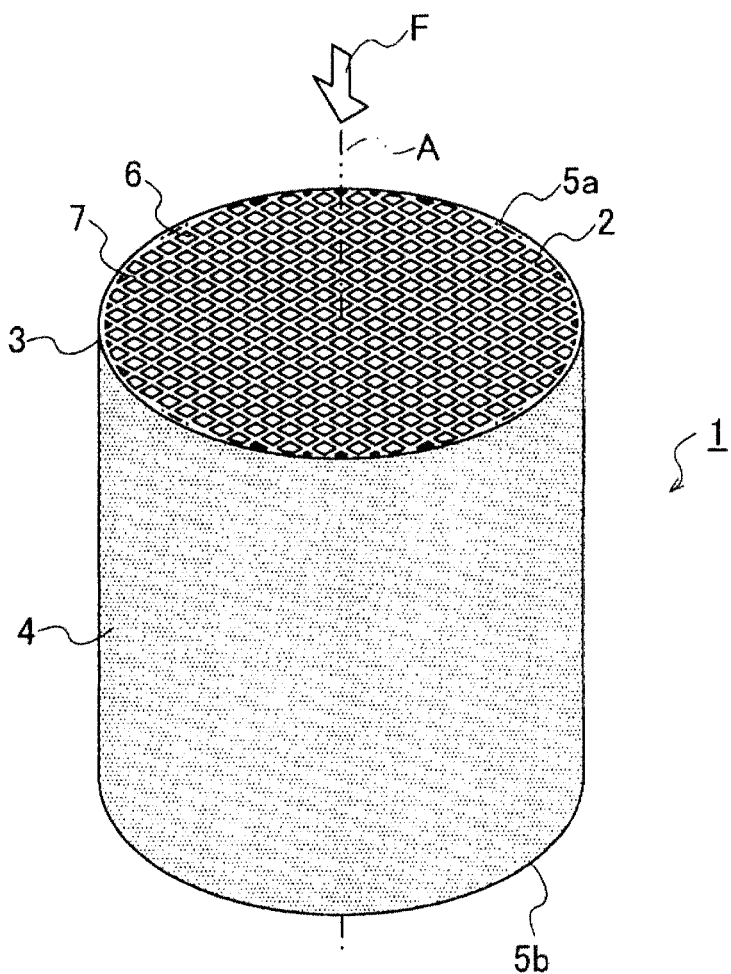
FIG. 1 is a perspective view showing a schematic constitution of a fluid heating component of one embodiment of the present invention.
Figure 2:
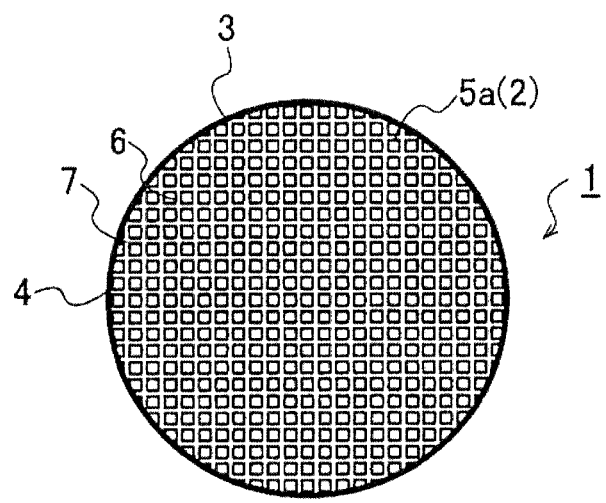
FIG. 2 is a plan view showing a schematic constitution of the fluid heating component.

As shown in FIG. 1 and FIG. 2, a fluid heating component 1 of one embodiment of the present invention includes a honeycomb structure 2 made of ceramics, and a conductive coating layer 4 disposed on at least a part of a circumferential surface 3 (the surface) of the honeycomb structure 2.

Furthermore, in a cut surface of the honeycomb structure 2 which is perpendicular to a passing direction (corresponding to a direction from the front of a paper surface to the depth of the paper surface in FIG. 2) of a fluid F (see FIG. 1), i.e., an axial direction A (see FIG. 1) of the honeycomb structure 2, the conductive coating layer 4 is disposed to annularly surround the whole circumference of the circumferential surface 3 of the honeycomb structure 2 (the whole circumference of the cut surface) in a state where the conductive coating layer is electrically connected.

Here, FIG. 2 is a plan view of the fluid heating component 1 seen from the upside. Furthermore, the conductive coating layer 4 disposed on the circumferential surface 3 is not necessarily required to be disposed over the whole circumferential surface 3 of the honeycomb structure 2, and may possess a ring shape (an annular shape) and have the electrically connected state in at least a part of the circumferential surface 3 (details will be described later).

The honeycomb structure 2 corresponds to a pillar-shaped member made of ceramics in the fluid heating component 1 of the present invention. Further specifically, the honeycomb structure 2 is a structure possessing a substantially round pillar shape and including latticed partition walls 7 which define a plurality of cells 6 extending from one end face 5a to the other end face 5b and formed as through channels for the fluid F.

Thus, the honeycomb structure 2 as the pillar-shaped member includes such a constitution, and hence the fluid F introduced from the one end face 5a of the honeycomb structure 2 of the fluid heating component 1 into the component passes through the cells 6 in the honeycomb structure 2 and is discharged from the other end face 5b. It is to be noted that the pillar-shaped member in the fluid heating component of the present invention is not limited to the substantially round pillar-shaped honeycomb structure 2 shown in, for example, FIG. 1, and there are not any special restrictions on the pillar-shaped member as long as the member includes therein a constitution to form the through channels for the fluid F.

The honeycomb structure 2 as the pillar-shaped member contains ceramics as a main component, it is therefore possible to increase a thermal conductivity of the partition walls 7 as well as the circumferential surface 3, and it is also possible to perform, for example, efficient heating of the fluid F. It is to be noted that in the present description, "the main component" is defined as a component containing 50 mass % or more of ceramics in the pillar-shaped member, and also contains, for example, metal composite ceramics.

As the above ceramics, various materials such as well-known cordierite and silicon carbide are usable. In particular, when heat conduction properties to the fluid F are taken into consideration, it is suitable to use, as a main component, at least one selected from the group consisting of silicon carbide, silicon nitride, aluminum nitride and magnesium oxide which have a high thermal conductivity. Furthermore, when the honeycomb structure 2 contains silicon carbide as the main component, there is a merit that the honeycomb structure is excellent in heat resistance and corrosion resistance in addition to the above thermal conductivity.

Additionally, as a material of a substrate constituting the honeycomb structure 2, for example, Si-impregnated SiC, (Si+Al) impregnated SiC, metal composite SiC, recrystallized SiC, or SiC can be employed. Here, further for the purpose of obtaining a high thermal conductivity, it is suitable that the honeycomb structure 2 (the pillar-shaped member) containing silicon carbide as the main component is dense (or substantially dense).

Specifically, a porosity of the honeycomb structure 2 is preferably from 0.1% to 10% or less, more preferably from 0.1% to 5% or less, and especially preferably from 0.1% to 2% or less. It is especially suitable to employ the above Si-impregnated SiC or (Si+Al) impregnated SiC. The SiC itself has a high thermal conductivity and is characterized in that it is easy to radiate heat, but in the case of Si-impregnated SiC, it is possible to further densely form the honeycomb structure, and the honeycomb structure 2 having a high thermal conductivity and a sufficient strength is obtainable. In the present description, the honeycomb structure (the pillar-shaped member) having a porosity of 10% or less is defined as the dense honeycomb structure.

For example, in a case of usual silicon carbide, its thermal conductivity is about 20 W/m·K, but when the porosity is adjusted to 2% or less, the thermal conductivity can be adjusted to about 150 W/m·K. It is to be noted that the above porosity is measured by Archimedes' method.

Here, in the honeycomb structure 2, the above thermal conductivity is in a range of 50 W/m·K to 300 W/m·K, and is further preferably 100 W/m·K or more. The thermal conductivity is more preferably from 120 W/m·K to 300 W/m·K and most preferably from 150 W/m·K to 300 W/m·K. When the thermal conductivity is adjusted in the above range, the heat conduction properties suitably improve, heat can efficiently be transmitted into the honeycomb structure 2, and the fluid F can rapidly be heated.

In addition, when the honeycomb structure 2 contains silicon carbide as the main component, an electric resistivity is in a range of 0.01 Ωcm to 10 Ωcm, and is further preferably 1 Ωcm or less. The electric resistivity is more preferably 0.1 Ωcm or less and especially preferably 0.05 Ωcm or less. In consequence, it is possible to further increase a heating efficiency by an electromagnetic induction heating system.

On the other hand, in the case of forming the pillar-shaped member by use of cordierite as the main component, it is preferable that a thermal expansion coefficient is from 0.1 ppm/K to 2 ppm/K. It is to be noted that as a measuring method of the thermal expansion coefficient, for example, there can be employed a method of cutting out, from the pillar-shaped member, a test piece having a length of 10 mm or more along the passing direction of the fluid F and having an area of 1 mm$^2$ or more and 100 mm$^2$ or less of a cross section including a direction perpendicular to this passing direction, and measuring the thermal expansion coefficient of this test piece in the passing direction with a differential thermal dilatometer by use of quartz as a standard comparison sample.

Here, in the case of forming the pillar-shaped member by use of cordierite as the main component, it is suitable that the member is dense (has a porosity of 10% or less) in the same manner as in the above member containing silicon carbide. In such a honeycomb structure, as compared with the honeycomb structure containing silicon carbide as the main component, the thermal conductivity decreases, but the thermal expansion coefficient can be minimized. Furthermore, specific heat is small, and hence the honeycomb structure can have an excellent thermal shock resistance. In consequence, it is possible to inhibit generation of cracks during heating, and due to a small specific weight, the honeycomb structure has an advantage of enabling a rapid temperature rise.

Figure 12:
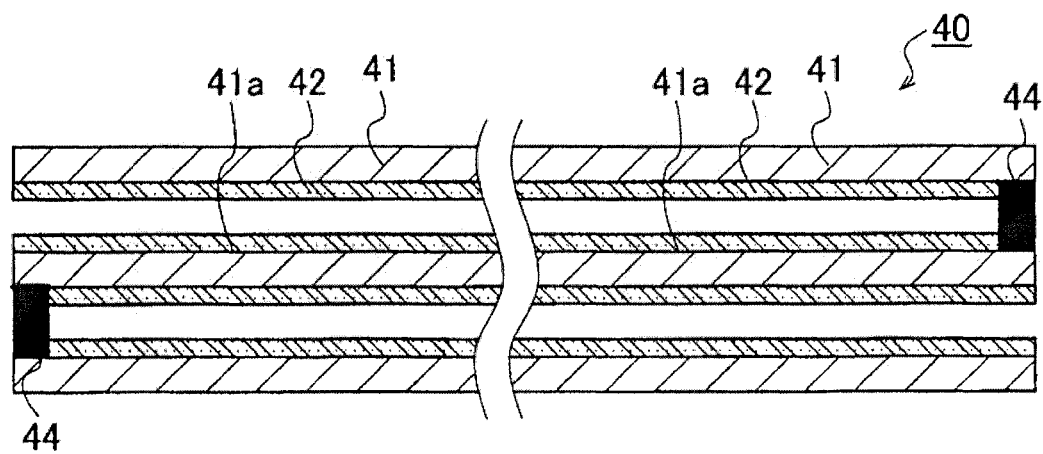
FIG. 12 is a partially enlarged end view showing an example of the schematic configuration of a surface layer formed on a partition wall of a honeycomb structure.

Moreover, a honeycomb structure 40 in the fluid heating component according to the present invention may be, for example, a structure in which a catalyst (not shown) is loaded on a partition-wall surface 41a of a partition wall 41 and in pores of the partition wall 41. In this way, the honeycomb structure 40 may be configured as a catalyst carrier in which a catalyst is loaded or a filter (e.g., diesel particulate filter (hereinafter, also called "DPF") and gasoline particulate filter) provided with plugging portions 44 to purify particulate matter (carbon particulates) in exhaust gas (see FIG. 12). Herein, FIG. 12 is a partially enlarged end view showing an example of the schematic configuration of a surface layer 42 formed on the partition wall 41 of the honeycomb structure 40.

When the honeycomb structure 40 is used as a catalyst carrier or an exhaust gas purification filter for an automobile, the honeycomb structure may employ predetermined ceramics as a main component and may have a porosity of 30 to 60%. Because a catalyst cannot be efficiently loaded and a function as a filter is decreased when the porosity is less than 30%, it is not preferable that the porosity is less than 30%. Moreover, because strength is not sufficient and durability is decreased when the porosity is more than 60%, it is not preferable that the porosity is more than 60%.

Furthermore, when the honeycomb structure 40 is used as a catalyst carrier or an exhaust gas purification filter for an automobile, at least a portion of the partition-wall surface 41*a* of the partition wall 41 may include the surface layer 42 that has breathability. The material of the surface layer 42 is not particularly limited, and can be appropriately selected from among materials such as ceramics, metal, and CMC (ceramic matrix composite) if needed.

The surface layer 42 may be a single layer or multiple layers. The surface layer 42 is formed on the partition-wall surface 41*a* of the partition wall 41. Herein, to have breathability means that the permeability of the surface layer 42 is $1.0 \times 10^{-13}$ m$^2$ or more. From the viewpoint of further reducing the pressure loss, it is preferable that the permeability is $1.0 \times 10^{-12}$ m$^2$ or more. Because the surface layer 42 has breathability, the pressure loss due to the surface layer 42 can be suppressed.

In the present specification, "permeability" means a physical property value computed by the following Equation 1 and is an indicative value indicating a passing resistance when predetermined gas passes through a corresponding object (partition wall or the like). Herein, in the following Equation 1, C indicates a permeability (m$^2$), F indicates a gas flow rate (cm$^3$/s), T indicates a sample thickness (cm), V indicates a gas viscosity (dynes·sec/cm$^2$), D indicates a sample diameter (cm), and P indicates a gas pressure (PSI). In addition, numeric values in the following Equation 1 indicate "13.839 (PSI)=1 (atm)" and "68947.6 (dynes·sec/cm$^2$)=1 (PSI)".

$$C = \frac{8\,FTV}{\pi D^2 (P^2 - 13.839^2)/13.839 \times 68947.6} \times 10^{-4} \quad \text{[Equation 1]}$$

When measuring the permeability, the permeability is measured in the state where the surface layer 42 is present by cutting out the partition wall 41 with the surface layer 42 and then the permeability is measured in the state where the surface layer 42 is scraped off, and the permeability of the surface layer 42 is calculated from these measurement results of the permeability and a ratio between the thickness of the surface layer 42 and the thickness of the partition wall 41.

Figure 3:
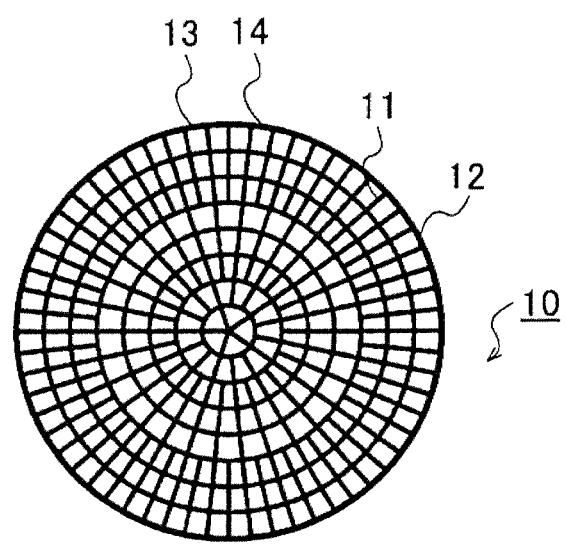
FIG. 3 is a plan view showing another example of the constitution of the fluid heating component.

Additionally, there are not any special restrictions on a shape of the cells of the honeycomb structure, and the cell shape can arbitrarily be selected from the group consisting of a round shape, an elliptic shape and polygonal shapes such as a triangular shape, a quadrangular shape and a hexagonal shape. For example, as in a fluid heating component 10 shown in FIG. 3, a honeycomb structure 12 may be used in which cells 11 are radially arranged, and a conductive coating layer 14 may be formed on a circumferential surface 13 of the honeycomb structure 12.

Figure 4:
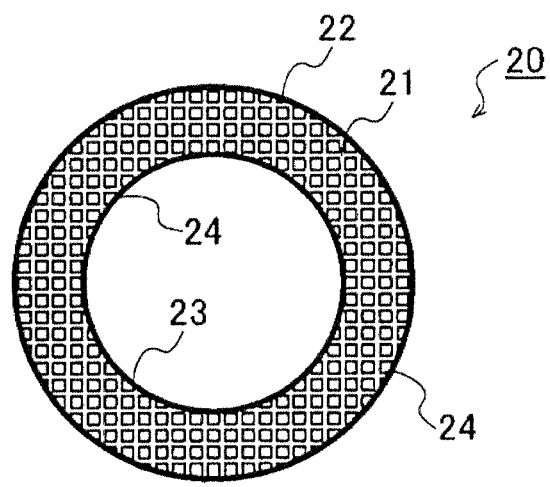
FIG. 4 is a plan view showing still another example of the constitution of the fluid heating component.

Alternatively, a honeycomb structure 21 including end faces having a donut shape may be used as in a fluid heating component 20 shown in FIG. 4. In this case, in the fluid heating component 20, conductive coating layers 24 may be disposed on each of an outer circumferential surface 22 (a surface) and an inner circumferential surface 23 (a surface) of the honeycomb structure 21 having the donut-shaped end faces, respectively. Alternatively, the conductive coating layer 24 may be disposed only on the outer circumferential surface 22 (the surface) or the inner circumferential surface 23 (the surface). Additionally, an outer shape of the honeycomb structure, an outer circumferential wall thickness, an inner circumferential wall thickness, a cell density, a partition wall thickness of partition walls, a partition wall density and others can arbitrarily be set.

Here, there are not any special restrictions on the thicknesses of the outer circumferential wall and the inner circumferential wall of the honeycomb structure 12, but each of the thicknesses is, for example, preferably in a range of 0.1 mm to 3.0 mm, more preferably in a range of 0.5 to 2.5 mm, and further preferably in a range of 0.5 mm to 1.0 mm. When the thickness of the outer circumferential wall or the like is excessively small, a structural strength easily decreases, and there occurs, for example, a problem that durability during use deteriorates. On the other hand, when the thickness of the outer circumferential wall or the like is excessively large, there is a problem that a defect during formation of the honeycomb structure 12 is easily generated to heighten manufacturing cost, and there is also the fear of deterioration of durability of the honeycomb structure 12 to thermal shock, for example, a rapid temperature rise or a rapid temperature drop. Therefore, it is necessary to limit the thickness of the outer circumferential wall or the like into the above range in forming the honeycomb structure 12.

The conductive coating layer 4 can be formed on the circumferential surface 3 of the honeycomb structure 2 by a well-known method such as a plating method, a thermal spraying method, a vacuum deposition method, a metallizing method, a chemical vapor deposition (CVD) method, a physical vapor deposition (PVD) method or an ion plating method. For the purpose of uniformly adjusting a coating layer thickness to form the conductive coating layer 4 which does not have any defects, it is preferable to employ the plating method or the thermal spraying method. These methods also have a merit that the methods can be performed at low cost.

There are not any special restrictions on a material constituting the conductive coating layer 4, but, for example, in a case of the plating method, well-known materials such as Ni, Ni—P, Ni—Fe, Ni—W, Ni—B—W, Ni—Co, Ni—Cr, Ni—Cd, Ni—Zn, Cr, another chromate treated coating, Co—W, Fe—W, Fe—Cr, Cr—C and Zn—Fe can be combined and used.

Furthermore, in addition to the above materials, metal elements such as tin (Sn), zinc (Zn), gold (Au), silver (Ag), copper (Cu), platinum (Pt), rhodium (Rh), palladium (Pd) and cadmium (Cd) are usable. Additionally, if necessary, carbides (silicon carbide, tungsten carbide, chromium carbide, boron carbide, etc.), oxides (alumina, silica, zirconia, tungsten oxide, titanium dioxide, molybdenum dioxide, etc.), graphite, boron nitride and various functional particles may be composited. Moreover, performing of a sealing treatment if necessary is one of preferable configurations. Thus, the sealing treatment is performed to improve a heat resistance, rust preventive properties and the like, and it is possible to improve the durability of the fluid heating component.

On the other hand, in a case of forming the conductive coating layer 4 by the thermal spraying method, there are not any special restrictions on the method, but, for example, a flame thermal spraying method, a high-speed flame thermal spraying method, an arc thermal spraying method, a gas plasma thermal spraying method, a water plasma thermal spraying method, a cold spraying method, an aerosol deposition (AD) method or the like is usable. In particular, the gas plasma thermal spraying method and the high-speed flame thermal spraying method are preferable, and the high-speed flame thermal spraying method is especially preferable. By these thermal spraying methods, it is possible to form the dense conductive coating layer 4 causing less oxidation and having a high quality, and these methods are suitable for a case of performing the heating by the electromagnetic induction heating system. Furthermore, the performing of the sealing treatment if necessary is also one of preferable configurations in the same manner as in the plating method.

Here, as already described, at least a part of the conductive coating layer 4 is required to be electrically connected along the whole circumference of the circumferential surface 3 of the honeycomb structure 2 in the cut surface of the honeycomb structure 2 which is perpendicular to the passing direction of the fluid F (the axial direction A of the honeycomb structure 2) (see FIG. 2). As described above, the fluid heating component of the present invention is heated from the outside by the electromagnetic induction heating system, and a heating means is not disposed in the fluid heating component 1 itself.

Therefore, when a region which is not electrically connected (which is electrically interrupted) is present along the whole circumference of the circumferential surface 3, the heating efficiency excessively deteriorates. Because more output is required or considerably high frequency is required in order to heat to a predetermined temperature, it is not preferable for a product for vehicle installation of an automobile etc. due to the upsizing or expensiveness of an electromagnetic induction heating device. Moreover, there is a possibility of occurrence of a defect that high Joule heat is generated in the region to cause local heating or electric discharge. For the purposes of preventing these situations, enabling uniform heating in the whole fluid heating component 1 and inhibiting the occurrence of the electric discharge, at least a part of the conductive coating layer is electrically connected along the whole circumference of the circumferential surface 3.

Figure 5:
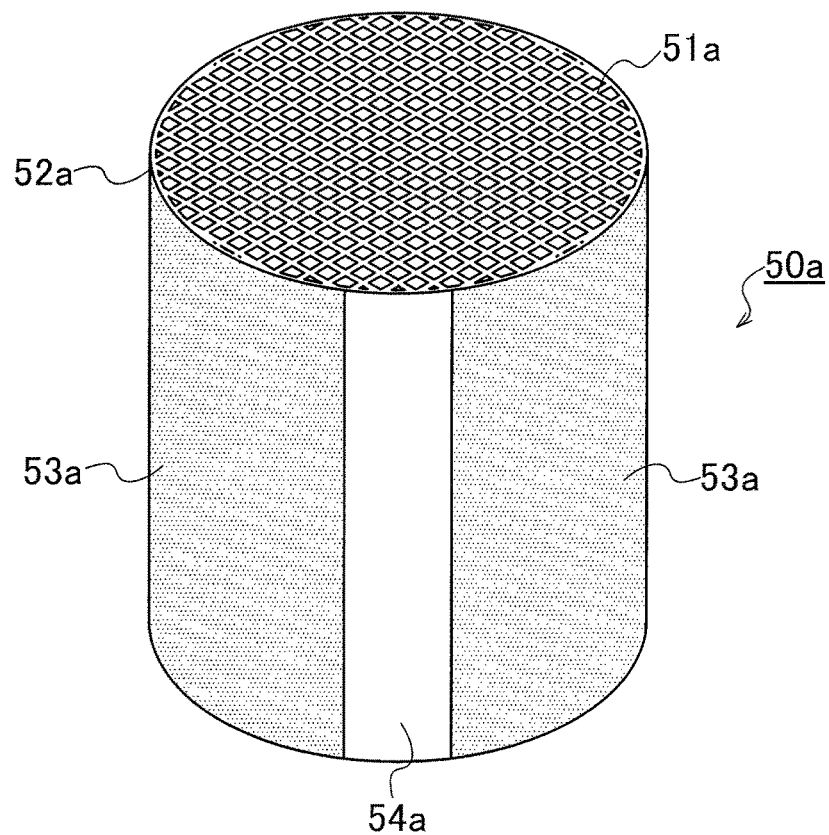
FIG. 5 is a perspective view showing one example of an incompatible fluid heating component.
Figure 6:
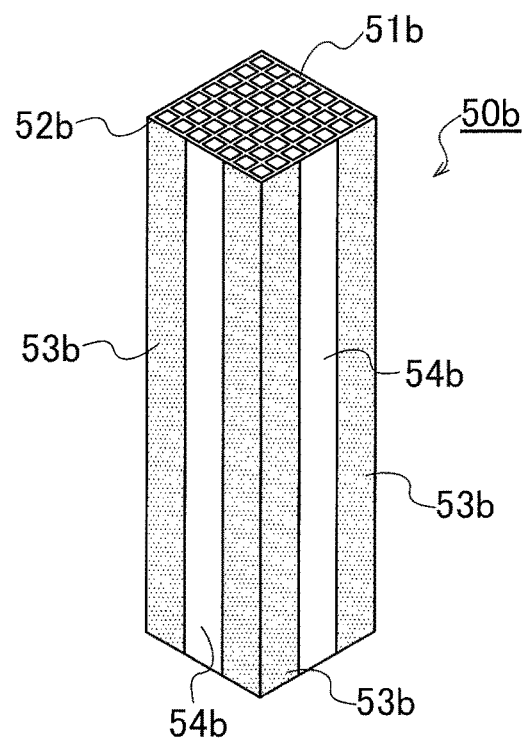
FIG. 6 is a perspective view showing another example of the incompatible fluid heating component.

Here, FIG. 5 and FIG. 6 show examples of incompatible fluid heating components 50*a* and 50*b*, respectively. That is, in a case of FIG. 5, a conductive coating layer 53*a* is formed along a circumferential surface 52*a* of a round pillar-shaped honeycomb structure 51*a*, but the conductive coating layer 53*a* is interrupted in a part of the circumferential surface 52*a*, and a cut surface of the honeycomb structure does not have a ring shape. Specifically, an insulating portion 54*a* is formed between the conductive coating layers 53*a*.

On the other hand, in a case of FIG. 6, a conductive coating layer 53*b* is formed along a circumferential surface 52*b* of a prismatic columnar honeycomb structure 51*b*, but similarly to the honeycomb structure 51*a*, the conductive coating layer 53*b* is interrupted in a part of the circumferential surface 52*b*, and a cut surface of the honeycomb structure does not have a ring shape. Specifically, an insulating portion 54*b* is formed between the conductive coating layers 53*b*. In this case, during heating by an electromagnetic induction heating system, an efficiency of electromagnetic induction during heating noticeably deteriorates in the fluid heating component 50*a* or 50*b*, and hence more power is required. Consequently, quick heating cannot be performed. Furthermore, there are cases where local deflection occurs in a temperature distribution, and the whole fluid heating component 50*a* or 50*b* cannot uniformly be heated.

The conductive coating layer 4 may possess a multilayer structure. That is, the conductive coating layer may be constituted of an abutment layer (a lowermost layer) which abuts on the circumferential surface 3 of the honeycomb structure 2 as the pillar-shaped member, and at least one laminated layer superimposed on the abutment layer. It is to be noted that to suitably adjust bonding properties to the circumferential surface 3 of the honeycomb structure 2 (the surface of the pillar-shaped member), the above abutment layer is especially suitably a material which has good compatibility with a ceramic material, a small thermal expansion coefficient and a low hardness and which does not react with the ceramic material (silicon carbide, cordierite or the like) constituting the substrate at a high temperature.

When the above abutment layer is a coating obtained by the plating method, the layer is preferably an electroless plating layer by an electroless plating method, and one of preferable configurations is a layer in which there are composited carbides (silicon carbide, tungsten carbide, chromium carbide, boron carbide, etc.), oxides (alumina, silica, zirconia, tungsten oxide, titanium dioxide, molybdenum dioxide, etc.), graphite, boron nitride and various functional particles. By the compositing, it is possible to obtain the abutment layer having the small thermal expansion coefficient and the good compatibility with ceramics.

On the other hand, each laminated layer superimposed on the above abutment layer (the lowermost layer) may be made of a material specialized in characteristics required for the conductive coating layer 4. For example, the laminated layers may include at least an induction heating layer made of a ferromagnetic material to perform the electromagnetic induction heating, and may further include a heat resistant layer superimposed on the induction heating layer and containing at least one metal element selected from the group consisting of Cr, Si, Al, Ni, W, B, Au, Rd, PD and Pt which are excellent in heat resistance, thermal shock resistance and corrosion resistance. Consequently, the whole conductive coating layer can produce an effect that the layer is excellent in, for example, bonding properties to the pillar-shaped member, heating properties, and heat resistance. It is to be noted that FIG. 1 to FIG. 10 show each of the conductive coating layer 4 and others as a single layer to simplify the drawings.

The coating layer thickness of the conductive coating layer 4 is from 0.1 µm to 500 µm, further preferably from 0.3 µm to 400 µm, more preferably from 0.5 µm to 200 µm, and especially preferably from 0.5 µm to 100 µm. When the coating layer thickness of the conductive coating layer 4 is adjusted in the above range, it is possible to inhibit peeling from the circumferential surface 3 or cracks of the honeycomb structure 2 due to the difference in thermal expansion coefficient between the conductive coating layer and the honeycomb structure 2, thereby enabling efficient heating. When the coating layer thickness is excessively small, there occurs the problem that the heating efficiency by the electromagnetic induction heating system remarkably decreases.

Furthermore, defects are easily generated during coating formation, and it becomes difficult to maintain the heat resistance, corrosion resistance and conductivity. Additionally, when the coating layer thickness is excessively large, a heat capacity increases more than necessary, a resistance decreases, and hence the heating efficiency or heating speed might deteriorate. In consequence, it is suitable to adjust the coating layer thickness of the conductive coating layer 4 in the above range. In this case, also when the conductive coating layer has the above-mentioned multilayer structure, it is necessary to adjust the coating layer thickness in the above range.

2. Fluid Heating Component Complex

A monolithically constructed fluid heating component complex 30a or 30b can be formed by combining a plurality of fluid heating components of the present invention having the above constitution. Here, FIG. 7 is an exploded perspective view showing a state before the fluid heating component complex 30a is constructed, FIG. 8 is a perspective view showing a schematic constitution after the fluid heating component complex 30a is constructed, FIG. 9 is an exploded perspective view showing a state before the fluid heating component complex 30b of another example of the constitution is constructed, and FIG. 10 is a perspective view showing a schematic constitution after the fluid heating component complex 30b of FIG. 9 is constructed.

Figure 7:
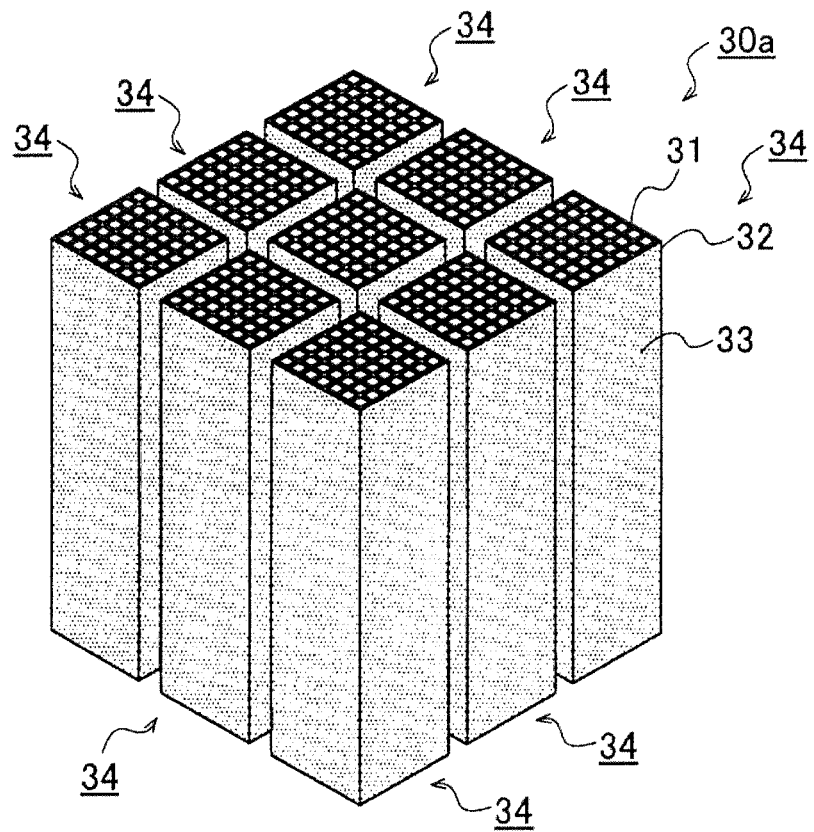
FIG. 7 is an exploded perspective view showing a schematic constitution of a fluid heating component complex.
Figure 8:
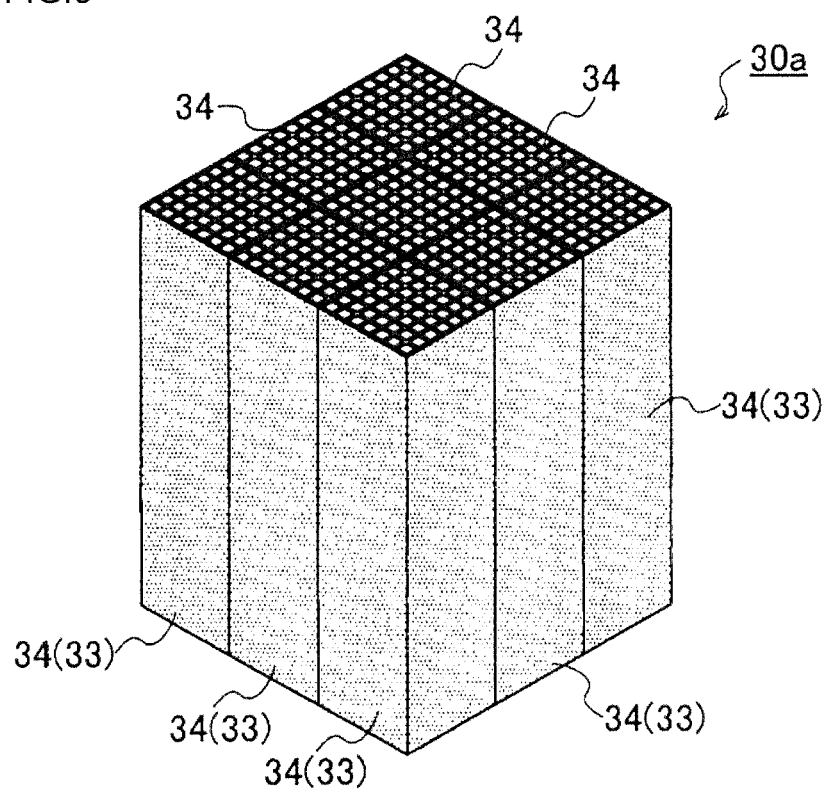
FIG. 8 is a perspective view showing the schematic constitution of the fluid heating component complex of FIG. 7.

As shown in FIG. 7 and FIG. 8, the fluid heating component complex 30a is constituted of a plurality of combined fluid heating components 34 each of which includes a prismatic columnar honeycomb structure 31 and a conductive coating layer 33 disposed along a circumferential surface 32 of the honeycomb structure 31.

That is, nine fluid heating components 34 having the same shape are used and combined in three vertical components× three horizontal components so that mutual conductive coating layers 33 face each other. It is to be noted that a well-known adhesive agent or the like to bond ceramic materials to each other is used in bonding the fluid heating components 34, and hence detailed description is omitted here. Consequently, the fluid heating component complex which can be used in a system of, for example, a large car or a machine tool is formed. Also in this case, the conductive coating layer 33 is electrically connected in a cut surface of the honeycomb structure which is perpendicular to a passing direction of a fluid F.

Figure 9:
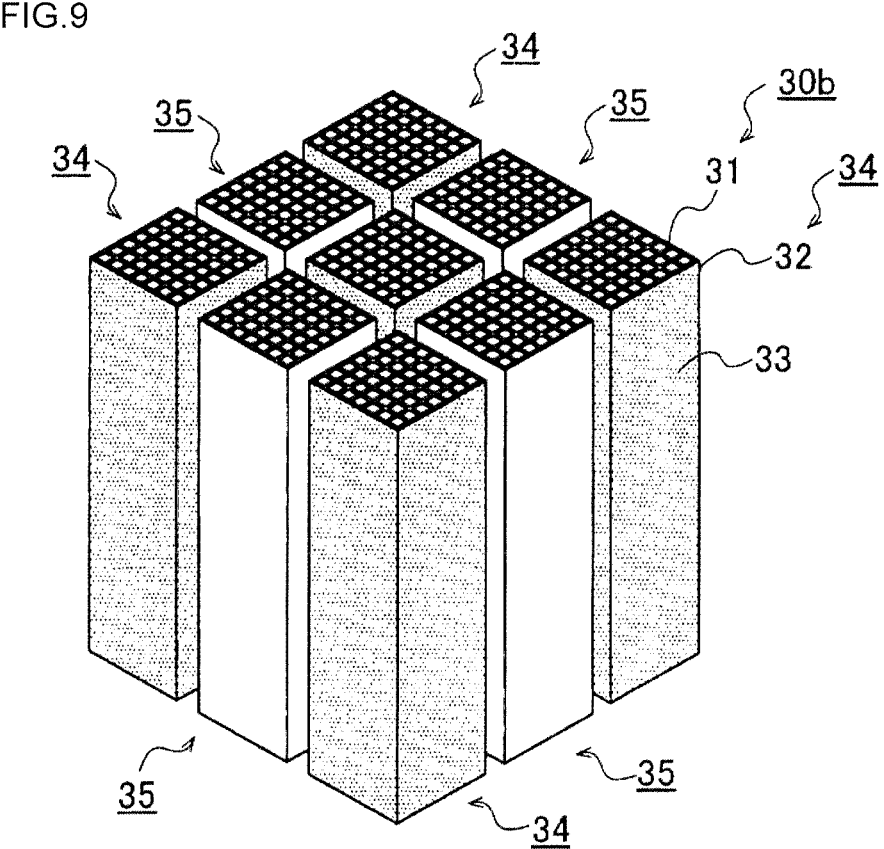
FIG. 9 is an exploded perspective view showing another example of the schematic constitution of the fluid heating component complex.
Figure 10:
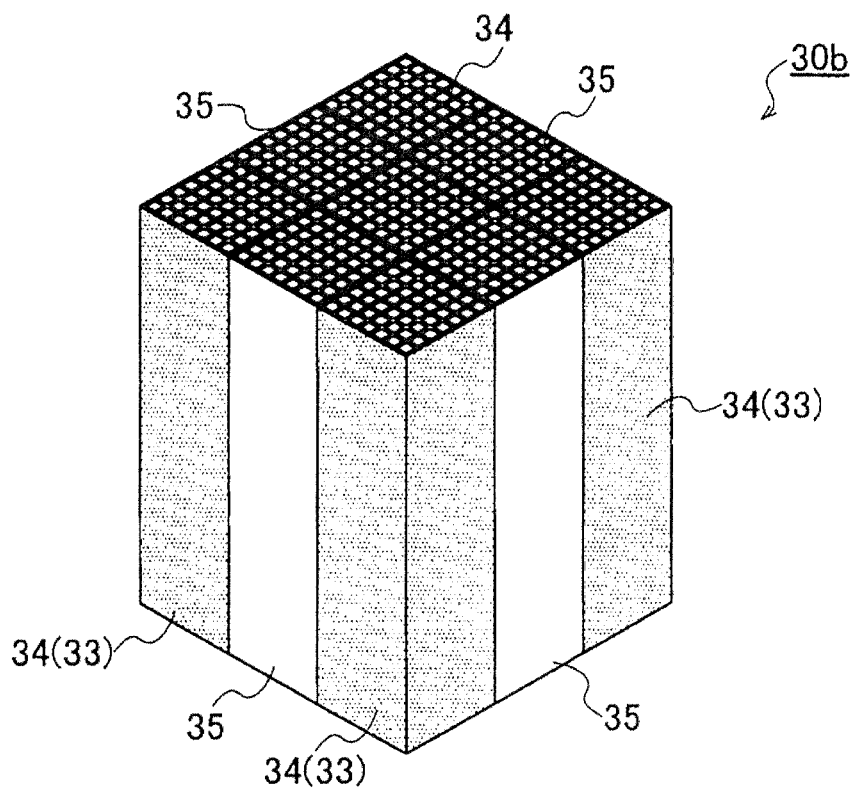
FIG. 10 is a perspective view showing the schematic constitution of the fluid heating component complex of FIG. 9.

Furthermore, the fluid heating component complex 30b of the other example of the constitution shown in FIG. 9 and FIG. 10 may be constituted. In the fluid heating component complex 30b of the other example of the constitution, five prismatic columnar fluid heating components 34 and four prismatic columnar honeycomb structures 35 which do not have the conductive coating layers 33 are alternately arranged and combined in three vertical components×three horizontal components. Also in this case, the fluid F can efficiently be heated by an electromagnetic induction heating system. It is to be noted that the same constitution as in the fluid heating component complex 30a shown in FIG. 7 and FIG. 8 is denoted with the same numerals, and description thereof is omitted.

Examples (1) Honeycomb Structure

A honeycomb structure containing SiC as a main component was manufactured. Initially, SiC powder adjusted in a predetermined particle size and in an amount to be prepared, a binder, and water or an organic solvent and others were kneaded to obtain a forming raw material, and the forming raw material was extruded into a desirable shape and dried to obtain a honeycomb formed body. Afterward, the honeycomb formed body was suitably processed, impregnated with Si and fired at a high temperature, to obtain a honeycomb structure. In this case, the honeycomb structure having sizes of a honeycomb diameter of 43 mm and a honeycomb length of 23 mm in an axial direction was used. Furthermore, an impregnation ratio or the like during the Si impregnation and firing was changed, to adjust a porosity of the honeycomb structure to 10% or less in Example 1. Similarly, a porosity of each honeycomb structure was adjusted to 5% or less in Examples 2 to 6 and Comparative Examples 1 and 2, and a porosity of a honeycomb structure was adjusted to 10% or more in Example 12. In Examples 7 to 12, bodies fired on conditions similar to those of honeycomb structures of Examples 1 to 6 were prepared, circumferential walls were ground to adjust each honeycomb diameter to 40 mm, and honeycomb structures each having a circumferential wall thickness smaller than that in Examples 1 to 6 were prepared. To obtain the circumferential wall thickness, thicknesses of 16 points in total in each circumferential wall were measured by using a measuring microscope, and an averaged value was considered as the circumferential wall thickness. Specifically, in the examples excluding Example 12, the honeycomb structure (a pillar-shaped member) which was a base of a fluid heating component was dense.

(2) Manufacturing of Fluid Heating Component (Formation of Conductive Film Layer)

A conductive coating layer was formed on a circumferential surface of each of the honeycomb structures obtained by the above (1). In this case, the circumferential surface of each of Examples 1 to 3 and 7 to 12 was plated with copper (Cu) as the conductive coating layer. Subsequently, Ni—B plating was performed in Example 4, Ni thermal spraying was performed in Example 5, and Mo thermal spraying was performed in Example 6. It is to be noted that the respective plating methods and thermal spraying methods are well known, and hence the description thereof is omitted here.

On the other hand, in Comparative Example 1, a honeycomb structure was used as it was without forming a conductive coating layer thereon, and in Comparative Example 2, Cu plating was performed, and an insulating portion was disposed in a part of a circumferential surface of a honeycomb structure and was not electrically connected. Specifically, a conductive coating layer was partially disposed on the circumferential surface. Table 1 mentioned below shows a summary of coating layer thicknesses of the respective conductive coating layers in Examples 1 to 12 and Comparative Example 2.

(3) Induction Heating Test

Figure 11:
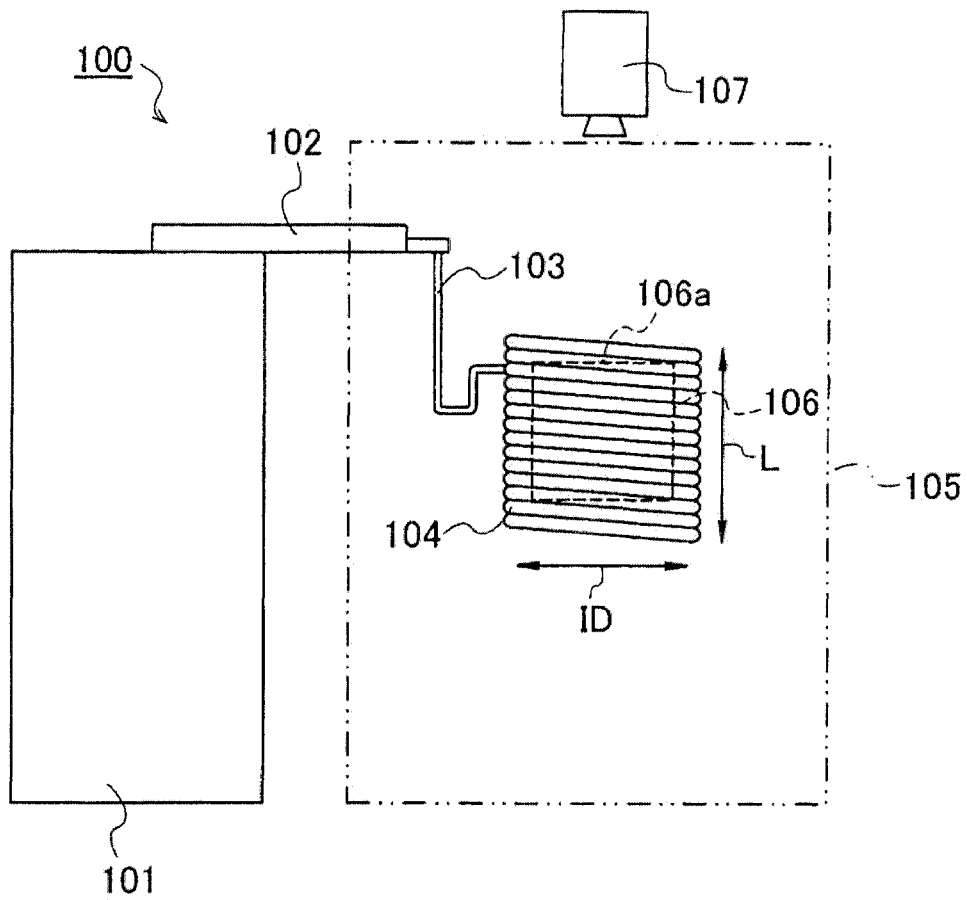
FIG. 11 is an explanatory view showing an induction heating test apparatus, and a schematic constitution of temperature measurement.

An induction heating test of each honeycomb structure as the fluid heating component was carried out by using an induction heating test apparatus 100 having a schematic constitution shown in FIG. 11. Here, the induction heating test apparatus 100 includes a high-frequency power device 101 which generates a high frequency, a flexible feeder 103 electrically connected to the high-frequency power device 101 through a feeder duct 102, a heating coil 104 connected to one end of the flexible feeder 103, a casing 105 disposed to surround the heating coil 104, and a thermo camera 107 disposed above a honeycomb structure 106 (a fluid heating component) stored in the heating coil 104, to measure a temperature of the honeycomb structure 106 (a temperature of one end face 106a) during induction heating by the heating coil 104 in a non-contact manner. Here, the thermo camera 107 is also called a thermal imaging camera and, for example, a camera CPA-2300 manufactured by CHINO is usable.

In the induction heating test, initially, the honeycomb structure 106 of a test object is disposed in an inner space of the heating coil 104 of the induction heating test apparatus 100, and in this state, a high-frequency current is generated from the high-frequency power device 101, to pass the high-frequency current through the heating coil 104 connected to the high-frequency power device 101 via the feeder duct 102 and the flexible feeder 103. Consequently, a high-frequency magnetic flux is generated in the heating coil 104. The honeycomb structure 106 disposed in the generated high-frequency magnetic flux induces the current and is heated. In the present example, the high-frequency power device 101 had a maximum output of 40 kW and a frequency of 30 kHz and a range of output control was adjusted to a range of 10% to 100%. It is to be noted that the heating coil 104 is constituted by using a round coil in which an inner diameter ID of the coil using a copper pipe is ϕ80 mm and a coil length L is 200 mm. Furthermore, cooling water is passed through the copper pipe of the heating coil 104. Additionally, description of details of supply of the cooling water into the heating coil 104 is omitted here.

(4) Measuring Method of Temperature

When the induction heating test was performed by using the induction heating test apparatus 100, temperatures of a plane of the one end face 106a of the honeycomb structure 106 was measured with the thermo camera 107 disposed above the heating coil 104, and the lowest temperature (at a central position) in the measured one end face 106a was considered as a measured temperature.

(5) Test Conditions

An output of the high frequency current by the high frequency power device 101 was set to an arbitrary output value of from 10% to 100%, and then a heating speed was measured with the thermo camera 107 by a technique described in the above (4). In this case, an induction heating output (kW) when the high frequency current was output to the heating coil 104 was calculated from numeric values of a voltmeter and an ammeter (not shown) mounted in the high frequency power device 101. Furthermore, a reaching time from the start of the output of the high frequency current until the measured temperature of the honeycomb structure 106 reached 300° C. was measured, and this time was considered as "an elapsed time". Additionally, when the time to reach 300° C. was 60 s or more or when temperature rise stopped in the middle, a reached temperature and an elapsed time at this point of time were recorded.

(6) Evaluation of Change in Appearance of Fluid Heating Component after Induction Heating Test A change in appearance of each fluid heating component after the induction heating test by the above (3), especially presence/absence of generation of cracks in each honeycomb structure was visually confirmed. The honeycomb structure in which any cracks were not present was evaluated as "A", the honeycomb structure in which cracks were present to such a level that the induction heating could not continue was evaluated as "C", and the honeycomb structure in which microcracks were present to such a level that the induction heating could continue was evaluated as "B". As a general evaluation, the example where a time to reach 300° C. was less than 30 s and any cracks were not present was evaluated as "A", the example where the time to reach 300° C. was less than 30 s but the microcracks were generated was evaluated as "B", and the example where the time to reach 300° C. was 30 s or more or the cracks were present to such a level that the induction heating could not continue was evaluated as "C". Table 1 mentioned below shows a summary of the test results of the above (3) to (5), the presence/absence of the cracks and the results of the general evaluation.

TABLE 1

| Unit | Honeycomb structure | | | | | Conductive coating layer | | Induction heating power kW | Elapsed time s | Reached temp. ° C. | Presence/absence of cracks | General evaluation |
|---|---|---|---|---|---|---|---|---|---|---|---|---|
| | Honeycomb dia. × honeycomb length mm × mm | Substrate | Porosity of substrate | Thickness of circumferential wall mm | Weight g | Metal type/forming method | Film thickness μm | | | | | |
| Example 1 | 43 × 23 | SiC | 9.8% | 2.41 | 39 | Cu/plating | 19 | 3.4 | 25 | 300 | A | A |
| Example 2 | 43 × 23 | SiC | 0.3% | 2.10 | 40 | Cu/plating | 20 | 3.8 | 20 | 300 | A | A |
| Example 3 | 43 × 23 | SiC | 2.1% | 2.11 | 40 | Cu/plating | 20 | 4.3 | 15 | 300 | B | B |
| Example 4 | 43 × 23 | SiC | 1.1% | 2.20 | 40 | Ni—B/plating | 20 | 3.5 | 22 | 300 | A | A |
| Example 5 | 43 × 23 | SiC | 1.6% | 2.17 | 42 | Ni/thermal spray | 100 | 3.4 | 30 | 300 | A | A |
| Example 6 | 43 × 23 | SiC | 1.1% | 2.20 | 41 | Mo/thermal spray | 52 | 3.4 | 28 | 300 | A | A |
| Example 7 | 43 × 23 | SiC | 9.5% | 0.89 | 27 | Cu/plating | 21 | 2.8 | 30 | 300 | A | A |
| Example 8 | 43 × 23 | SiC | 2.0% | 0.69 | 28 | Cu/plating | 20 | 3.4 | 20 | 300 | A | A |
| Example 9 | 43 × 23 | SiC | 4.5% | 0.73 | 28 | Cu/plating | 20 | 4.2 | 18 | 300 | A | A |
| Example 10 | 43 × 23 | SiC | 0.9% | 0.65 | 28 | Cu/plating | 19 | 4.3 | 13 | 300 | A | A |
| Example 11 | 43 × 23 | SiC | 1.3% | 0.73 | 28 | Cu/plating | 20 | 5 | 12 | 300 | A | A |
| Example 12 | 43 × 23 | SiC | 12.0% | 0.91 | 27 | Cu/plating | 20 | 2.9 | 30 | 300 | B | B |
| Comparative Ex. 1 | 43 × 23 | SiC | 0.8% | 0.69 | 28 | No coating | — | 3.5 | 60 | 300 | A | C |

TABLE 1-continued

| | Honeycomb structure | | | | | Conductive coating layer | | Induction | | | | |
|---|---|---|---|---|---|---|---|---|---|---|---|---|
| Unit | Honeycomb dia. × honeycomb length mm × mm | Substrate | Porosity of substrate | Thickness of circumferential wall mm | Weight g | Metal type/ forming method | Film thickness μm | heating power kW | Elapsed time s | Reached temp. °C. | Presence/ absence of cracks | General evaluation |
| Comparative Ex.2 | 43 × 23 | SiC | 0.5% | 0.71 | 28 | Partial(Cu)/ plating | 20 | 2.8 | 115 | 100 | A | C |

*Heating conditions) induction coil: ϕ80, and frequency: 30 kHz (7) Conclusion

As shown in Table 1, in each of Examples 1 to 12 satisfying requirements of the present invention, it was possible to reach 300° C. within an elapsed time of 30 s from the start of the heating in the induction heating test. Furthermore, in the examples, any cracks were not generated in the honeycomb structure to such a level that the induction heating could not continue, and the result of the general evaluation was "A" or "B". Therefore, when such an example is used as a part of a heating system of an exhaust gas purifying catalyst, the catalyst can be activated immediately after the start of an engine, and it is expected that a large effect is produced in improvement of a fuel efficiency.

Additionally, in the fluid heating components of Examples 1 to 6, it has been confirmed that any especially noticeable significance was not recognized as to a metal type and a forming method of the conductive coating layer formed on the circumferential surface of the honeycomb structure, and a suitable result can be obtained in a prescribed range of the present invention. Furthermore, it has also been confirmed that in the fluid heating components of Examples 7 to 12 in each of which the circumferential wall was thin, the suitable result was also obtainable, and heating was possible without generating any cracks even at a higher heating speed as compared with Examples 1 to 6.

On the other hand, in each of the fluid heating component which did not include the conductive coating layer (Comparative Example 1) and the fluid heating component (Comparative Example 2) in which the whole circumference of the cut surface of the honeycomb structure was not disposed in the electrically connected state in the cut surface of the honeycomb structure which was perpendicular to the passing direction of the fluid, the heating speed was low. An elapsed time of 100 s was required from the start of the heating by the induction heating test until the temperature reached 300° C. (Comparative Example 1), or with the elapse of a time of 115 s, the temperature finally reached 100° C. (Comparative Example 2). Thus, it has been indicated that rapid heating or temperature rise cannot be achieved. Therefore, it has been confirmed that it is difficult to employ the comparative examples in the heating system for the improvement of the fuel efficiency.

Furthermore, as shown in Example 12, it has been indicated that when the porosity (=12.0%) of the honeycomb structure was higher than that in any other example, the cracks were easily generated in the induction heating test. However, the cracks were comparatively light and micro and there were scarcely practical problems. Therefore, it has been confirmed that in the present invention, it is especially suitable to use the dense ceramic material having a porosity of 10% or less in the pillar-shaped member.

A fluid heating component of the present invention and a fluid heating component complex can be used in a heating system or the like to heat an exhaust gas purifying catalyst for improvement of a fuel efficiency of a car.

DESCRIPTION OF REFERENCE NUMERALS 1, 10, 20 and 34: fluid heating component, 2, 12, 21, 31, 35, 40, and 106: honeycomb structure, 3, 13, 22 and 32: circumferential surface, 4, 14, 24 and 33: conductive coating layer, 5a and 106a: one end face, 5b: the other end face, 6 and 11: cell, 7, 41: partition wall, 23: inner circumferential surface, 30a and 30b: fluid heating component complex, 41a: partition-wall surface, 42: surface layer, 44: plugging portion, 50a and 50b: fluid heating component (incompatible examples), 51a and 51b: honeycomb structure (incompatible examples), 52a and 52b: circumferential surface (incompatible examples), 53a and 53b: conductive coating layer (incompatible examples), 54a and 54b: insulating portion, 100: induction heating test apparatus, 101: high frequency power device, 102: feeder duct, 103: flexible feeder, 104: heating coil, 105: casing, 107: thermo camera, A: axial direction, F: fluid, ID: inner diameter of the coil, and L: coil length.

What is claimed is:
1. A fluid heating component comprising:
 a pillar-shaped member made of ceramics and formed with through channels through which a fluid passes, and
 a separate conductive coating layer disposed on at least a part of a circumferential surface of the pillar-shaped member,
 wherein the conductive coating layer is disposed on the whole circumference of a cut surface of the pillar-shaped member in a state where the conductive coating layer has an uninterrupted electrical connection, in the cut surface of the pillar-shaped member which is perpendicular to a passing direction of the fluid.
2. The fluid heating component according to claim 1, wherein the pillar-shaped member is a honeycomb structure comprising partition walls which define a plurality of cells extending from one end face to the other end face and formed as the through channels.
3. The fluid heating component according to claim 1, wherein the pillar-shaped member is made of dense ceramics, and
 a porosity of the pillar-shaped member is in a range of 0.1% to 10%.
4. The fluid heating component according to claim 1, wherein the pillar-shaped member is made of ceramics having a thermal conductivity of from 50 W/m·K to 300 W/m·K.

5. The fluid heating component according to claim 1, wherein the pillar-shaped member is made of ceramics containing, as a main component, at least one selected from the group consisting of silicon carbide, silicon nitride, aluminum nitride and magnesium oxide.

6. The fluid heating component according to claim 1, wherein the pillar-shaped member is made of ceramic containing silicon carbide as a main component, and an electric resistivity of the pillar-shaped member is from 0.01 Ωcm to 10 Ωcm.

7. The fluid heating component according to claim 1, wherein the pillar-shaped member is made of ceramic containing, as a main component, cordierite having a thermal expansion coefficient from 0.1 ppm/K to 2 ppm/K.

8. The fluid heating component according to claim 1, wherein the conductive coating layer possesses a layer structure, and comprises:

an electroless plating layer which is in contact with the surface of the pillar-shaped member, and at least one induction heating layer laminated on the electroless plating layer.

9. The fluid heating component according to claim 1, wherein the conductive coating layer has a thickness of from 0.1 μm to 500 μm.

10. A fluid heating component complex which is formed by using the fluid heating component according to claim 1, and which is monolithically constructed by using a plurality of prismatic columnar fluid heating components, or which is monolithically constructed by using at least one of the prismatic columnar fluid heating components, and one or a plurality of prismatic columnar pillar-shaped members made of ceramics and formed with through channels through which a fluid passes.

* * * * *